UNITED STATES PATENT OFFICE.

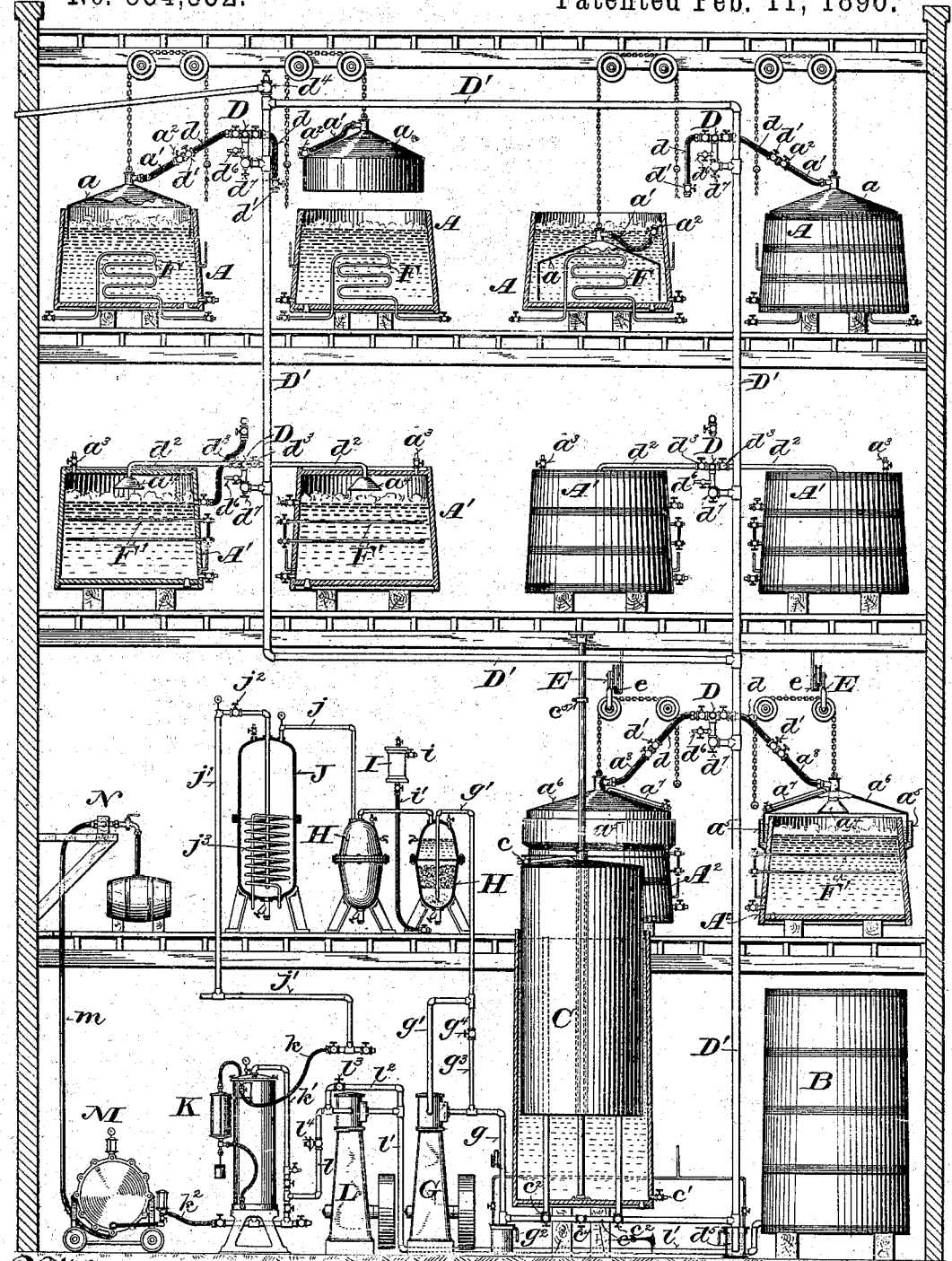

JACOB F. THEURER AND PAUL FISCHER, OF MILWAUKEE, WISCONSIN, ASSIGNORS TO THE PABST BREWING COMPANY, OF SAME PLACE.

PROCESS OF AND APPARATUS FOR OBTAINING AIR-FREE CARBONIC-ACID GAS FROM FERMENTATION FOR CARBONATING BEER, &c.

SPECIFICATION forming part of Letters Patent No. 554,352, dated February 11, 1896.

Application filed May 7, 1895. Serial No. 548,402. (No model.)

*To all whom it may concern:*

Be it known that we, JACOB F. THEURER and PAUL FISCHER, of Milwaukee, in the county of Milwaukee and State of Wisconsin, have invented certain new and useful Improvements in Processes of and Apparatus for Obtaining Air-Free Carbonic-Acid Gas from Fermentation for Carbonating Beer and other Purposes; and we do hereby declare that the following is a full, clear, and exact description of the invention, which will enable others skilled in the art to which it pertains to make and use the same, reference being had to the accompanying drawing, and to the letters of reference marked thereon, which forms a part of this specification.

The main objects of our invention are to save in a condition suitable for future or immediate use the carbonic-acid gas produced by fermentation of beer and other fermentable liquids and to utilize such gas for recarbonating storage-beer or other liquids.

It consists essentially in expelling and excluding air from the gas-collecting space of a fermenting-vessel and conducting therefrom free from air the gas produced therein by fermentation for immediate or future use; in the direct and continuous process of utilizing such gas for recarbonating the beer or other beverages from which it has been derived, or for carbonating other liquids, and in apparatus for performing the above-mentioned operations, as hereinafter specifically explained, and pointed out in the claims.

In the manufacture of beer and other similar fermented beverages large quantities of carbonic-acid gas are produced by fermentation and are generally wasted. Efforts have been made to save and utilize this waste gas for recarbonating beer or other beverages and for other purposes, but the mixture of air with the gas has rendered it unsuitable for recarbonating beer and for similar uses. Various attempts have been made to separate the air from the gas after it leaves the fermenting tubs or vessels, and the methods heretofore proposed for that purpose have generally depended upon the difference in the specific gravity of air and gas; but we have found by experience that it is impracticable to separate the air directly from the gas on account of the tendency of the gas to diffuse and mingle with the air, even under the most favorable conditions. Another method of accomplishing this separation, described in an application for United States Letters Patent, Serial No. 501,136, filed February 23, 1894, is based upon the fact that water and other liquids under given conditions absorb carbonic-acid gas with great facility, but do not so absorb air. While this process is practicable, it is somewhat circuitous and complicated. We have found that after active fermentation sets in nearly if not quite pure carbonic-acid gas is produced while such fermentation continues, and upon this fact our improved process and apparatus are based.

Referring to the accompanying drawing, which shows partly in vertical section and partly in elevation apparatus constructed and arranged in accordance with our invention for carrying into effect our process, A, A' and A² designate fermenting-tubs, some of which are such as are commonly employed in breweries for the manufacture of beer.

B designates an ordinary storage-cask, and C an extensible gas holder or receiver provided with a valved air-vent c, opening from the highest point of the bell, and with a valve and hose or pipe connection c' at or near the bottom of the outer or stationary part of the receiver for the purpose of filling the receiver with water and withdrawing the water when necessary. The vent c also serves in starting the apparatus at the outset to allow any air which may collect in the top of the receiver to be expelled by inflowing gas. When once in operation it is not intended nor is it necessary to allow any air whatsoever to enter the main pipe D' or gas-receiver.

D are branch gas-collecting pipes passing between the several rows of tubs and connected by a main pipe D' with the gas-receiver C, or with a compressor, carbonator or other apparatus which is to be supplied with air-free gas.

The fermenting-tubs A A in the upper tier or story are of the ordinary open kind, and are provided with removable bells or hoods $a\ a$, approximately fitted into their open tops and adapted to inclose a space above the surface of the beer or liquid contained therein. They are suspended over the tubs by chains or cables passing over suitably-located sheaves, and are provided at their apexes or uppermost points with hose connections, to which are attached sections of hose $a'\ a'$, provided at their outer ends with couplings and valves $a^2$. The gas-collecting mains D are provided adjacent to the several tubs with hose connections to which are attached hose-sections $d\ d$, also provided at their outer ends with valves $d'$ and couplings by which they are connected when desired with the hose-sections $a'$.

In the tier or story next below, the tubs A' A' are permanently closed and are provided at the uppermost points therein with air-vent valves or connections $a^3\ a^3$. They are severally connected at the top with the gas-collecting mains D by branch pipes $d^2$, which are provided with valves $d^3$, and which may terminate within the tubs in bells or flaring mouths $a^4$ opening a short distance below the tops of the tubs.

In the second story we have shown a modified form of open fermenting-tubs $A^2\ A^2$. They are provided on the outside at or near the top with annular receptacles $a^5\ a^5$, for holding water or other suitable sealing liquid, and with removable bells or covers $a^6\ a^6$, the rims of which are adapted to enter said receptacles and thus form a gas-tight inclosure over the open tops of the tubs. Each of the covers $a^6$ has a valve-controlled air-vent $a^7$ leading out of the apex or upper part thereof, and a valve-controlled gas connection $a^8$, which may terminate inside of the cover with a flaring mouth $a^4$, like or similar to those shown in the tubs A', and provided with a valve and coupling for attachment to a hose-section $d$, which is connected with one of the gas-collecting mains D. Each bell or cover $a^6$ is suspended from a trolley E, adapted to traverse a track $e$, extending over a row of tubs, and it may thus be used to collect gas from any tub of the row as desired, according to the condition or stage of fermentation taking place therein.

The several fermenting-tubs may be provided with attempering-coils F and F', as shown, for modifying or regulating the temperature of the fermenting liquid as desired. The coils F F are arranged so as not to interfere with the operation of the bells or hoods $a\ a$.

The gas-pipe D' or one of its connections is provided with a safety-valve $d^4$ and waste connection, by which overpressure is avoided in the gas-collecting system, including the fermenting-tubs, pipes D D' and the receiver C. At the lowest point therein the pipe D' communicates with a trap $d^5$, by which any moisture carried with the gas into and condensing in the gas-collecting pipes is caught and prevented from passing into the gas-receiver C or producing back-pressure in the fermenting-tubs.

G is a gas-pump connected on the suction side by a pipe $g$ with the gas-receiver C, and on the force or discharge side by the pipe $g'$ with one or more gas-purifiers H H. The suction-pipe $g$ communicates at the lowest point therein with a trap $g^2$, by which any liquid drawn into or condensed in said pipe is caught and prevented from entering the pump. The traps $d^5$ and $g^2$ being open at the top and having water-supply and overflow connections serve also to prevent overpressure in the gas-collecting system, the maximum pressure attainable being determined by the height of the water column in said traps. The suction and discharge pipes $g$ and $g'$ of the pump are connected by a by-passage or pipe $g^3$, which is provided with an automatic regulating valve or device $g^4$, whereby communication is automatically established between the suction and force or discharge sides of the pump when the pressure on the discharge side reaches a certain predetermined point.

I is a receptacle for producing a solution of certain sterilizing agents or chemical substances and delivering it free from air to the purifiers, which are supplied with broken marble or other material presenting an extended surface and tending to retard the flow of gas through them. It has a valve-controlled water-supply connection $i$ and a pipe or hose connection $i'$ provided with a valve and coupling at one end for attachment to either purifier without admitting air thereto. The sterilizing agents or chemicals placed in said receptacle are dissolved and taken up by the water as it passes through it into either purifier, and destroy any organic matter carried by the gas.

J designates a condenser, which is connected by a pipe $j$ with the last of the series of purifiers and has an outlet-pipe $j'$ leading from the lower part thereof and provided with a reducing-valve $j^2$, whereby the gas is delivered at the desired pressure. The condenser is provided with a coil $j^3$ through which brine or a cooling medium is circulated, for the purpose of condensing and collecting any moisture that may be carried by the gas from the purifiers. Such condensed liquid collecting at the bottom of the condenser is removed from time to time through a suitable waste valve or connection.

For the immediate or direct utilization of the gas thus collected, purified and dried for recarbonating storage-beer, we provide a carbonating device K, of any suitable construction, which may be like or similar to that shown in United States Patent No. 519,140, dated May 1, 1894, and is provided with devices for automatically regulating the supply of gas thereto according to the supply and pressure of beer. It is connected with the gas-pipe $j'$, which has a valve and coupling, by a hose $k$, having a valve and coupling at its delivery end for attachment to the carbonator without admitting air thereto. It is also connected with the force or discharge pipe $l$ of a pump L by a pipe $k'$, which has valves on opposite sides of its connection with pipe $l$ for admitting beer either into the top or bottom of the carbonator, and a wastecock for discharging air from the carbonator when it is first filled from the bottom with beer in starting the apparatus. The suction-pipe $l'$ of the pump L is connected with the storage cask or tank B, and by a by-passage or pipe $l^2$, having an automatic regulating valve or device $l^3$, with the force or discharge pipe $l$, whereby communication is established between the suction and discharge connections of the pump whenever the pressure on the discharge side of the pump reaches a certain predetermined point. The pipe $l$ is provided with a reducing-valve $l^4$, by which the supply of beer to the carbonator is regulated and maintained at a constant pressure. The excess of beer delivered by the pump is conducted through the by-passage or pipe $l^2$ back to the suction-pipe $l'$. From the carbonator the charged beer or other liquid is conducted by a pipe or hose $k^2$ to a filter M, and thence by a pipe or hose $m$ to the racking-bench N, where it is drawn into shipping-kegs in the usual way. When the gas is not required for immediate use it may be conducted from the delivery-pipe $j'$ into a storage-tank, or may be liquefied or compressed in the usual cylinders for storage, shipment and future use.

In performing our improved process by means of the apparatus hereinbefore described, when open fermenting-tubs are employed, the hood or bell $a$ is first lowered into the tub, and with its hose connection $a'$ is completely immersed in the liquid, the valve $a^2$ in the hose connection being opened. Air is thus completely displaced in the hood and its connections, and when fermentation actively takes place in the liquid we close the valve $a^2$ in the hose connection and elevate the hood to the position in which it is shown at the left in the upper tier of tubs.

The system of gas-collecting pipes D D' having been first filled with air-free gas supplied from other fermenting-tubs or any convenient source, the valve $d'$ in the adjacent hose $d$ is opened, permitting the gas to expel any air that may be contained in said hose, which is then coupled to hose $a'$. The valve $a^2$ is now opened, and as the gas is given off by the liquid it is collected by the bell $a$ and conducted through the connections above mentioned into pipe D and thence through pipe D' into the receiver C.

To certainly avoid the collection of air with gas at the outset and to save time by beginning to collect the gas at the earliest practicable stage of fermentation, the bell $a$ may be connected with the gas-collecting main before it is raised above the surface of the liquid in the tub and gas introduced into it from said main as it is elevated into operative position. A very low pressure is maintained in the system of gas-collecting pipes so as not to interfere with fermentation and impede the separation of gas from the liquid. As soon as the supply of gas from the liquid is sufficient to overbalance the slight pressure in the gas-collecting system it will pass from the bell in which it accumulates, free from air, into the main and thence through its connections into the gas-receiver C. If gas is collected from the fermenting-tubs faster than it is used, it will extend the receiver and accumulate therein. When the receiver is filled and its bell engages with the stop $a^5$, or from any cause the gas-pressure rises above the desired limit, it will open the safety-valve $d^4$, or in case that fails for any reason to operate the gas will displace the water column in one or both of the traps $d^5$ and $g^2$ and escape until the pressure is reduced to normal, the safety-valve $d^4$ being set to open at a lower pressure than that required to displace the water in either of said traps, thus avoiding objectionable back-pressure in the fermenting-tubs. With closed fermenting-tubs, such as A' A', the vent-valves $a^3$ $a^3$ are left open during the initial stages of fermentation, and when it is desired to collect gas therefrom the valves $d^3$ in pipes $d^2$ are opened and gas is admitted from the main into the gas-collecting spaces of the tubs. All traces of air are thus expelled, with more or less gas, from the gas-collecting spaces through the vents $a^3$. As soon as pure gas issues from the vents they are closed, and then the gas produced by fermentation of the liquid within the tubs accumulates therein until its pressure exceeds that in the collecting-main, whereupon it will flow, free from air, into said main as long as active fermentation continues and the connection between said main and fermenting-tubs is maintained.

The operation of the open fermenting-tubs A² is substantially the same as that of the closed fermenting-tubs A'. At the outset the gas connection $a^8$ is coupled by a hose $d$ with a gas-main, and the valve in the air-vent connection $a^7$ is opened. All air is thus expelled from the gas-collecting space inclosed by the bell over the surface of the liquid by the inflowing gas, and as soon as substantially pure gas issues therefrom, the air-vent is closed. The bell being now filled with pure gas and air excluded therefrom, the pressure is increased by the accumulation of gas given off by the fermenting liquid until it overcomes the pressure maintained in the gas-collecting pipes and flows free from air to the receiver. Gas thus collected from the fermenting-tubs may be directly employed to recarbonate beer or similar beverages taken directly from the storage casks or tanks. For this purpose the beer is drawn by the pump L from a storage-cask and forced with a regulated pressure through a carbonator and thence to the racking-bench for filling shipping-kegs or other receptacles. The necessary supply of gas for carbonating the beer on its passage from the storage-cask to the racking-bench is taken from the receiver C and forced by pump G with a regulated pressure to the carbonator K. Thus the gas which is given off from the beer during the process of fermentation is collected and directly re-used for carbonating beer or other beverages.

A very small percentage of the gas produced by the fermentation of beer and other similar beverages is needed for recarbonating it, and while the continuous and direct recarbonating of beer is taking place the surplus gas may be accumulated in a receiver for future use or employed for other purposes.

In practice it is necessary to frequently empty and wash and to occasionally dry and varnish the fermenting-tubs inside. Thus air is unavoidably and frequently admitted thereto. For this reason and to avoid interference with the process of fermentation and interruption of the ordinary operation of a brewery, it is customary to place the fermenting-tubs in different cellars or apartments and to empty, wash and refill them with wort in rotation or alternation. In accordance with the usual practice it is to be understood that the fermenting-tubs of our apparatus, which are connected with the several gas-collecting pipes D D, are located in different cellars or apartments, so that some or all of the tubs in any cellar may be emptied, washed, dried and varnished without interfering with or interrupting the production and collection of gas from tubs in other cellars or apartments.

Since it is customary to brew at frequent intervals, and a single brewing ordinarily fills a number of tubs, it follows that the beer in some or all of the tubs of one or more cellars is always at the proper stage of fermentation or in condition to yield gas. It is therefore generally desirable to connect a number of tubs simultaneously with the gas-delivery main, and to save the time and trouble of venting and connecting such tubs separately we provide the several branch collecting-pipes with air-vent valves $d^6$ $d^6$ and closely-associated shut-off valves $d^7$ $d^7$ next to the delivery-main D'. Air contained in the gas-collecting spaces of any or all tubs which are connected with any pipe D and are in condition to yield gas is expelled by the gas produced in such tubs through the common vent-valve $d^6$, while the associated valve $d^7$ is closed, and when the effects of diffusion and all traces of air have been removed and air-free gas issues from said vent the vent is closed and all said tubs are simultaneously connected with the main D' by opening the valve $d^7$. In this way a number of tubs are simultaneously connected with the main in the same manner as individual tubs without admitting air to gas previously collected or interrupting the operation of the apparatus.

By the method and means hereinbefore explained of expelling and excluding air from the fermenting-tubs nearly or quite pure carbonic-acid gas is directly obtained from the fermentation of the liquid contained therein, and this gas may be advantageously used under ordinary conditions without further purification or condensation. By positively expelling air from the gas-collecting spaces of the fermenting-tubs by the introduction of pure carbonic-acid gas from the main or some other outside source gas free from air can be obtained from such tubs much sooner than it otherwise could be, but by waiting a sufficient length of time for the gas produced by fermentation to completely displace the air contained in the collecting-spaces of those tubs from which it is desired to collect air-free gas substantially the same result is secured. Although this involves some loss of time and waste of gas, it is perfectly practicable, particularly in large breweries where there are constantly available many different fermenting-tubs from which gas may be obtained.

When economy of gas is not essential, the receiver or holder C may be disconnected for the purpose of repairing or cleansing it or it may be altogether dispensed with and the gas delivered as it is collected from the fermenting-tubs by the main D' directly to the carbonator or other apparatus.

For the purpose of delivering gas at will to the receiver or directly to the carbonator or other apparatus, the supply and discharge pipes of the gas-holder C are provided with valves $c^2$ $c^2$ and connected below by a pipe $c^3$ provided with a valve $c^4$. By closing the valve $c^4$ and opening the valves $c^2$, the gas will be caused to pass into the gas-holder and thence to the carbonator; but by opening the valve $c^4$ and closing the valves $c^2$ the gas will be shut off from the gas-holder and caused to pass directly from pipe D' to the carbonator.

The hoods of the open fermenting-tubs have sufficiently heavy rims to hold them steadily in place and prevent their being raised out of the liquid into which they project by the greatest gas-pressure intended to be produced in the gas-collecting system, and the bell or movable part of the gas receiver or holder C is weighted and arranged so as to maintain or admit of a substantially constant low pressure in the gas-collecting pipes and fermenting-tubs.

Many changes in the details of the apparatus may be made without departing from the spirit and intended scope of our invention.

We claim—

1. The method of obtaining air-free carbonic-acid gas, which consists in hermetically sealing a gas-collecting space communicating with a fermenting tub or vessel, with the exception of an air-escape, expelling through said air-escape all the air contained in said space without admitting it into the gas-receiver or delivery-conduit, and finally, after the air has been thus expelled, closing said air-escape and conducting off from said space the gas produced by the fermenting liquid in said vessel, substantially as set forth.

2. The method of obtaining air-free carbonic-acid gas, which consists in hermetically sealing a gas-collecting space communicating with a fermenting tub or vessel, with the exception of an air-escape, expelling through said air-escape the air contained in said space by filling the same with air-free gas, without admitting the expelled air into the gas-receiver or delivery-conduit, and finally, after the air has been thus expelled, conducting off the gas produced by the fermenting liquid in said vessel, substantially as set forth.

3. The method of obtaining air-free carbonic-acid gas, which consists in hermetically sealing against atmospheric air, a gas-collecting space communicating with a fermenting tub or vessel; introducing carbonic-acid gas into said space from a source outside the fermenting-vessel, and thereby at once expelling the confined air; and finally, connecting said space with a conduit or receiver and drawing off the carbonic-acid gas entering the collecting-chamber from the fermenting liquid.

4. The method of obtaining air-free carbonic-acid gas, which consists in hermetically sealing a gas-collecting space communicating with a fermenting-vessel, with the exception of an air-escape, expelling all the contained air from said space through said air-escape without admitting it into the gas receiver or delivery main, and after the air has been expelled, collecting the gas entering said space from the fermenting liquid in said vessel, and maintaining a constant pressure greater than atmospheric pressure, whereby in the event of leakage, the outward pressure of the gas is caused to exclude atmospheric air and overpressure in the fermenting-vessel is prevented, substantially as set forth.

5. The herein-described operation of carbonating beer, which consists in hermetically sealing a gas-collecting space communicating with a fermenting-tub, with the exception of an air-escape, expelling all the contained air from said space through said air-escape without admitting it into the gas-delivery main or conduit, collecting within said space after the air has been expelled therefrom, the carbonic-acid gas given off by the fermenting liquid in said vessel, maintaining within said space a uniform gas-pressure but little above atmospheric pressure, withdrawing the surplus gas from said space, and finally delivering it at a higher pressure to the carbonator, substantially as set forth.

6. The herein-described method of obtaining a constant supply of air-free carbonic-acid gas for the direct and continuous carbonation of beer, which consists in hermetically sealing gas-collecting spaces communicating with fermenting-vessels, with the exception of air-escapes, expelling through said air-escapes all the air contained in said spaces without admitting it into the delivery main or conduit, closing each air-escape when the air has been completely expelled from its gas-collecting space, collecting in the air-free spaces the gas given off by the fermenting liquid, and connecting them in succession or alternation with the main or conduit by which the carbonators are supplied, substantially as set forth.

7. In an apparatus or system for collecting carbonic-acid gas, the combination of a series of fermenting-tubs, close covers or hoods applied to and hermetically sealing said tubs, valved air-vents for permitting the escape of all the air from said tubs without admitting it into the gas-delivery main, a gas-main provided with valved connections for establishing communication at will between said main and said tubs, a trap applied to said main to collect and remove moisture condensing within said main, and a safety-valve opening from said main and serving to relieve or prevent undue pressure therein.

8. The direct and continuous process of carbonating beer, which consists in the following steps: first, inclosing and hermetically sealing the fermenting-space of a fermenting-vessel with the exception of an air-escape, and allowing carbonic-acid gas to accumulate therein until it completely drives out the contained atmospheric air and overcomes the effects of diffusion; second, closing said air-vent and leading the gas thereafter produced to a conduit or receiver; third, drawing a portion of the gas from the conduit or receiver into the carbonator and utilizing the same to carbonate beer; fourth, delivering surplus gas from the conduit or receiver to the similarly-inclosed fermenting-space of another fermenting-vessel to eliminate atmospheric air therefrom, and thereafter connecting said space with the conduit or receiver,—different fermenting-vessels being thus connected in succession or alternation,—whereby a constant supply of air-free gas is delivered to the carbonator from the fermenting-vessels.

9. In combination with a receiving main or conduit, a fermenting-vessel provided with a top or closure adapted to hermetically seal or inclose a fermenting-space above the liquid of the vessel; a valve-controlled vent opening from said space, and serving to permit escape of air therefrom to the atmosphere in starting the apparatus; and a valve-controlled connection between the main and the fermenting-space of the vessel; whereby carbonic-acid gas may be introduced to drive air from the fermenting-space preparatory to collecting gas from the fermenting liquid, and gas from said liquid may thereafter be delivered to the main or conduit free from air.

10. In combination with a plurality of fermenting-vessels, each provided with a top or closure adapted to hermetically seal or inclose a fermenting-space above the liquid of the vessel, valve-controlled vents through which all the air may be removed from such spaces without admitting it into the gas-delivery main, a main or conduit to receive gas from said vessels, and valve-controlled connections adapted to establish communication at will between the main or conduit and the fermenting-space of any of said vessels.

11. In combination with a main or conduit, and with a gas-holder in communication therewith; a series of fermenting-vessels each provided with a top or closure adapted to hermetically seal or inclose a fermenting-space above the liquid, valve-controlled air-vents for said tops or closures, and independent valve connections adapted to establish communication at will between the main or conduit and the fermenting-space of any of the vessels; whereby gas may be delivered from the gas-holder to the fermenting-space of such vessels to drive the air therefrom, after which and upon closure of the air-vents, air-free gas may be delivered through the main to the receiver and there stored for use in removing air from freshly-filled vessels and for other purposes.

12. The herein-described apparatus for the continuous and direct carbonation of beer, comprising the following elements in combination: a series of fermenting-vats each provided with a closure adapted to seal or inclose a fermenting-space, and provided with a valve-controlled air-escape; a main or conduit; valve-controlled connections adapted to establish communication between the fermenting-spaces and the main at will; a gas-holder in communication with said main; a carbonator; a pump interposed between the gas-holder and the carbonator and serving to deliver gas wholly free from air from the former to the latter under proper pressure; and a second pump communicating with a beer-supply and serving to deliver beer to the carbonator under proper pressure.

13. The herein-described apparatus for continuous and direct carbonation of beer, consisting of the following elements in combination: a series of fermenting-vats each provided with a closure adapted to seal or inclose a fermenting-space, and provided with a valve-controlled air-escape; a main or conduit; valve-controlled connections adapted to establish communication between the fermenting-space and the main at will; a gas-holder in communication with said main; a carbonator; a pump interposed between the gas-holder and the carbonator and serving to deliver gas wholly free from air to the carbonator under proper pressure; a beer-supply; a second pump communicating with the beer-supply and serving to deliver beer to the carbonator under proper pressure; a filter in communication with the delivery of the carbonator, and a racking-faucet in communication with the filter; whereby beer may be continuously and directly carbonated by carbonic-acid gas derived from the fermenting-vats, while such beer is on its way from the supply to the racking-bench.

14. In a carbonic-acid-gas-collecting apparatus of the character described, the combination of a fermenting-vessel having a seal or closure for the fermenting-space; a main or conduit to convey gas from said space; and a pipe connected with the main and having a coupling at its free end, provided with a valve; whereby air may be excluded from said pipe when the latter is disconnected from the fermenting-space of the vessel.

15. In carbonic-acid-gas-collecting apparatus of the character described, the combination of a number of fermenting-vessels having seals or closures for the fermenting-spaces; a main or conduit to convey gas from said spaces and a pipe connected with the main and provided with a valve at or near its junction with the main, and an associated air-vent valve between it and the fermenting-vessels, substantially as set forth.

16. The herein-described operation of carbonating beer which consists in the following steps: first, inclosing and hermetically sealing the fermenting-space of a fermenting-vessel with the exception of an air-escape, and allowing carbonic-acid gas to accumulate therein until it completely displaces the contained air and overcomes the effects of diffusion; second, excluding the air thus displaced from the gas-receiver or delivery-conduit; third, closing said air-escape and leading the gas thereafter produced in said fermenting-space into said conduit or receiver wholly free from air; fourth, leading the air-free gas from said conduit or receiver to a carbonator and utilizing the same to carbonate beer, substantially as set forth.

In testimony that we claim the foregoing as our own we affix our signatures in presence of two witnesses.

JACOB F. THEURER.
PAUL FISCHER.

Witnesses:
ALFRED SCHEDLER,
CHAS. L. GOSS.